(No Model.)

W. G. GRAY.
CIDER MILL.

No. 366,165. Patented July 5, 1887.

WITNESSES:
Robert Kirk,
Dugald McKillop.

INVENTOR:
Walter G. Gray
By J. E. Gerber
Attorney.

N. PETERS, Photo-Lithographer, Washington, D. C.

United States Patent Office.

WALTER G. GRAY, OF PLEASANT VIEW, TENNESSEE, ASSIGNOR OF ONE-HALF TO WM. THOMAS BRACEY, OF SAME PLACE.

CIDER-MILL.

SPECIFICATION forming part of Letters Patent No. 366,165, dated July 5, 1887.

Application filed August 28, 1886. Serial No. 212,093. (No model.)

*To all whom it may concern:*

Be it known that I, WALTER G. GRAY, of Pleasant View, in the county of Cheatham and State of Tennessee, have invented a new and useful Improvement in Cider-Mills, which improvement is fully set forth in the following specification and accompanying drawings, in which—

Figure 1:
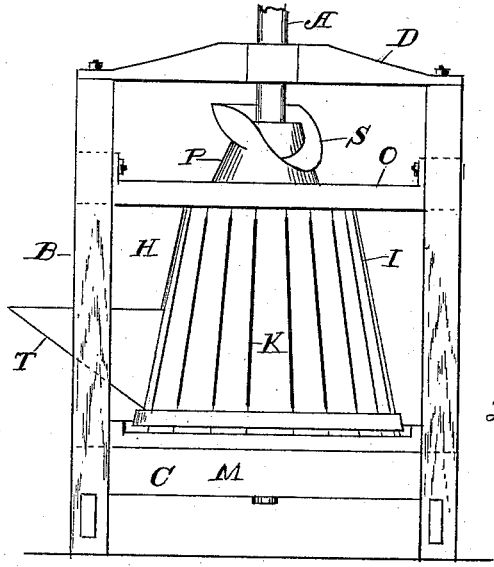
Figure 2:
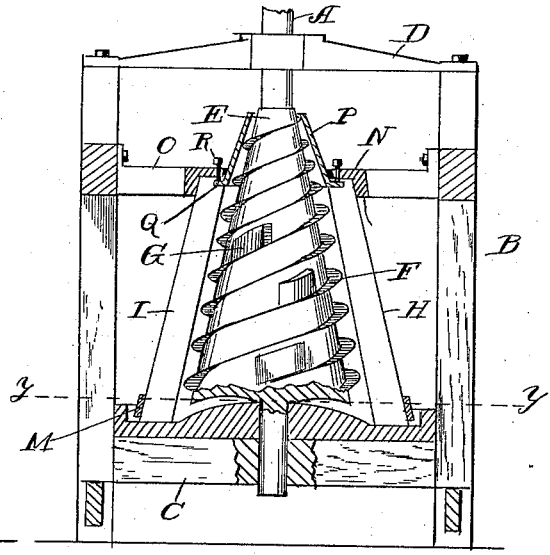
Figure 4:
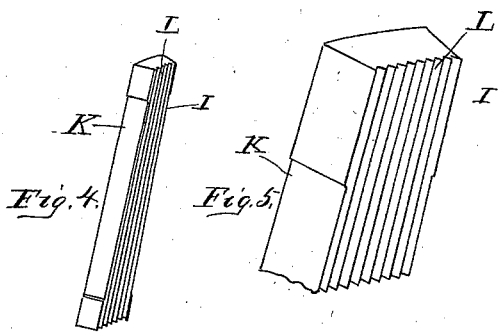
Figure 5:
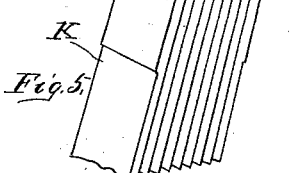
Figure 3:
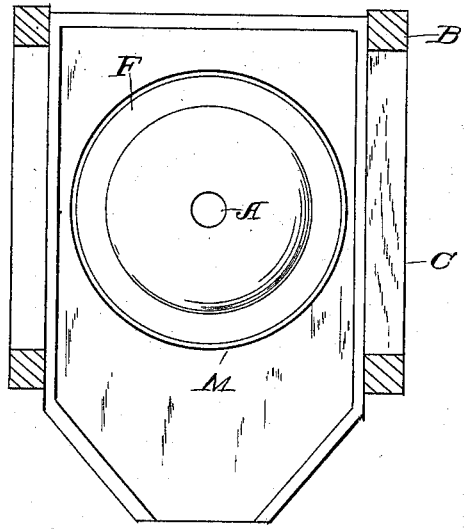

Figure 1 is a side elevation of my improved cider and vegetable mill. Fig. 2 is a vertical central section of the same. Fig. 3 is a plan view of Fig. 2 through line Y; Fig. 4, a perspective view of one of the staves detached; Fig. 5, an enlarged perspective view of a section of one of the staves, and Fig. 6 a perspective view of one of the eccentric wedge-shaped crushers and spiral flanges.

My device relates to an improvement in cider-presses, consisting of a cone-shaped stem having thereon metal spiral flanges and wedge-shaped crushers operating within a cone-shaped cylinder or case so disposed as to receive the fruit or vegetables at the bottom of the case and be driven along the space between the cone-shaped stem and the case by the spiral flange of the cone-shaped stem, thus serving the double purpose of grinding or crushing the fruit and conveying it upward through the device, permitting the cider to escape below while the pomace is expelled above, all of which will now be set forth in detail.

Figure 6:
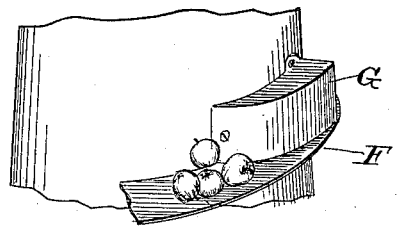

In the accompanying drawings, A represents the stem of the cone, to the upper end of which the power is applied, either by means of a lever or sweep, or by means of a pulley and belt. (Not shown in the drawings.) This is journaled centrally within a frame, B, having at the lower part the cross-piece C, and above the bracket or cross-piece D. The lower end of this stem A is formed cone-shaped, E, having thereon a peripheral screw-flange, F, while between this spiral screw-flange F, I dispose a series of spiral wedge-shaped crushers, G, as shown in Fig. 6. Outwardly from this cone-shaped part E of the stem A, I provide a shell or case, H, consisting of independent detachable staves I, one of which is shown in Fig. 4, having the sides K cut away slightly, so as to permit of the escape of the cider, while the inner face is provided with a series of grooves, L, designed to materially assist the crushing of the apples or fruit as the cone-piece E rotates. The lower ends of these staves I are designed to rest within the band or rim M, resting on the cross-bar C of the frame. The upper ends of these staves I rest beneath a metal plate, N, the outer side having a series of arms, O, attached to the frame B. Just within the circular rim or plate N, I provide a metal cone-shaped adjustable collar, P, surrounding the upper part of the cone-shaped piece E of the stem A. The lower part of this adjustable collar has an annular flange, Q, resting immediately beneath the rim N, and the inner flange of this rim N has a series of set-screws, R, so disposed as to come in contact with the upper face of this annular flange Q, so that when the set-screws are turned down the adjustable collar P will press down close to the flanges F on the outer face of the cone-piece E, and thus contract the aperture between the upper side of the adjustable cone-collar P and the outer face of the cone-piece E. Outwardly the upper part of the adjustable cone-collar P is provided with a discharge-hopper, S. The lower part of the case H is provided with a feeding-hopper, T, by means of which the apples or fruit may be fed into the lower part of the case or shell H, and as there is no opening other than the hopper at the lower part of the device the apples or fruit are first crushed by having the wedge-shaped pieces G coming in contact with them and gradually forced upward by the spiral flange F; and, as will be noticed, the sides of the case H are not parallel with the outer face of the cone E, but inclined inwardly somewhat, so as to contract the space between them, and in the same manner the cone-collar P is also contracted the same way, so that but a very small opening is left at the top between the cone and the cone-collar. The cone-piece E is also made smaller as it approaches the top of the cone-shaped collar P, and the same may be said of the crushers G; so that as the said stem A rotates, the apples or fruit are driven upward and crushed by coming in contact with the corrugated surface L on the inner face of the staves I, permitting the cider or juice to escape through the opening between the staves, while the pomace is discharged through the opening between the upper part of the cone-collar P and the cone E, where they are received into the discharge-hopper S.

Having described my invention, what I claim as new is—

1. In a cider-mill, a rotating cone-shaped and flanged stem, combined with a cone-collar at its upper end, which collar is adjustable, substantially as described, whereby the space between the stem and its flanges and the collar can be regulated at will.

2. The combination of the cone-shaped stem E, having thereon the spiral flange F, and the wedge-shaped crushers on said flange, with the case H, substantially as described.

3. The combination of the metal cone-collar P, provided with an annular flange, Q, and cone-stem E, metal rim N, having arms O, and staves I, substantially as herein set forth and described.

4. In a cider-mill, a case inclosing the crushing mechanism and consisting of staves each cut away or recessed at the side and grooved on the inner face, combined with a retaining-band at the lower end and a rim at the upper end, substantially as shown and described.

5. The combination of the case H, formed inwardly with the corrugations L, the band M, the rim N, and set-screws R, with the metal cone-collar P, cone-stem E, spiral piece F, crushers G, and frame B, the whole arranged as and for the purpose substantially as herein set forth and described.

In testimony that I claim the foregoing I have hereunto set my hand in the presence of witnesses.

WALTER G. GRAY.

Witnesses:
DUGALD MCKILLOP,
ROBERT KIRK.